(12) United States Patent
Barbedette et al.

(10) Patent No.: US 8,949,400 B2
(45) Date of Patent: Feb. 3, 2015

(54) SERVER MANAGEMENT SYSTEMS

(75) Inventors: Gilles Barbedette, Vincennes (FR); Patrick Jeulin, Bicetre (FR)

(73) Assignee: Oracle International Corporation, Redwood Shores, CA (US)

( * ) Notice: Subject to any disclaimer, the term of this patent is extended or adjusted under 35 U.S.C. 154(b) by 879 days.

(21) Appl. No.: 13/265,121

(22) PCT Filed: Jan. 8, 2009

(86) PCT No.: PCT/US2009/030456
§ 371 (c)(1),
(2), (4) Date: Feb. 8, 2012

(87) PCT Pub. No.: WO2010/080152
PCT Pub. Date: Jul. 15, 2010

(65) Prior Publication Data
US 2012/0131166 A1    May 24, 2012

(51) Int. Cl.
*G06F 15/16*   (2006.01)
*H04L 29/08*   (2006.01)
*G06F 21/41*   (2013.01)

(52) U.S. Cl.
CPC ............... *H04L 67/16* (2013.01); *H04L 67/32* (2013.01); *G06F 21/41* (2013.01); *H04L 67/34* (2013.01)
USPC .......................................... 709/223; 709/224

(58) Field of Classification Search
CPC .................................. H04L 67/32; H04L 67/16
USPC ................................................. 709/223, 224
See application file for complete search history.

(56) References Cited

U.S. PATENT DOCUMENTS

| | | |
|---|---|---|
| 5,341,477 A | 8/1994 | Pitkin |
| 2002/0095522 A1 | 7/2002 | Hayko |
| 2005/0129026 A1 | 6/2005 | Chang |
| 2005/0246441 A1 | 11/2005 | Chandrasekaran |

OTHER PUBLICATIONS

PCT International Search Report for International Application No. PCT/US2009/030456 (Oct. 2009).

*Primary Examiner* — Adnan Mirza
(74) *Attorney, Agent, or Firm* — Kilpatrick Townsend & Stockton LLP

(57) ABSTRACT

A system for managing one or more services during the provision of an application to a user is provided. The system comprises an application component operably connected to a network and configuration data for the user. The configuration data specifies: one or more partner servers configured to supply one or more respective services within one or more respective service categories, each partner server in a service category being chosen from a plurality of available partner servers for the service category and communication parameters for each partner server that allow communication with the partner server over the network. During the provision of the application to the user, the application component uses the configuration data for the user to access a service provided by an appropriate partner server.

29 Claims, 12 Drawing Sheets

```
<ServiceCategories>
    <category name= "Report">
        <partnerServerType id= "PartnerTypeA"/>
        <partnerServerType id= "PartnerTypeB"/>
    </category>
</ServiceCategories>
```

Figure 10

```
<partnerServerType name="PartnerTypeA">
    <description>Partner server type A </description>
    <implementation>
        <component name= "ADriver.jar" language= "java"/>
        <version>A - 4.1.3.3.1</version>
    </implementation>
    ...
    <parameters>
        <property name="url" type = "string" value="X"/>
        <property name="user" type="string" parameter= "id"/>
        <property name="p_word" type="string" parameter= "p" />
        ...
        <property name="format" type="string" parameter= "pdf"/>
    </parameters>
    ...
</partnerServerType>
```

Figure 11

```
<partnerServername="PartnerServerD" type= "PartnerTypeA">
    <description>Partner Server D used as report engine </description>
    <properties>
        <host>www.partnerserverd.com</host>
        <port>8080</port>
        ...
    </properties>
</partnerServer>
```

Figure 12

SERVER MANAGEMENT SYSTEMS

CROSS-REFERENCES TO RELATED APPLICATIONS

This application is a U.S. National Stage Application of PCT/US2009/030456, filed Jan. 8, 2009.

BACKGROUND OF THE INVENTION

1. Field of the Invention

The present invention is in the field of networked computer systems. In particular, the present invention relates to the provision of an application to a user, the provision of the application requiring a system and a method for managing a plurality of servers accessible over a network, wherein each server supplies a separate service for use in the application.

2. Description of the Related Art

Many modern computer applications make use of external services. These services may comprise functions, methods or data that are provided by a third party independently of the computer-program code or hardware that implements the computer application. The service may be provided by computer-program code processed by a local or remote processor or may be provided using dedicated electronic circuitry. Typically, the computer application will not have access to the operation of the external service and the external service will not have access to the operation of the computer application, e.g. have access to protected code loaded into local memory. Instead, the computer application will call upon the service using a defined interface.

The use of external services is particularly suited to the provision of a computer application over a network. In this case, an application server may comprise computer-program code that, in use, is processed by a processor of a first server computer. Said server computer may then be connected to a client device over the network. By exchanging data with the client device, the application server provides an application to a user. When the application server wishes to make use of external services it may communicate with a second server computer over the network, wherein, in use, the second server computer processes computer-program code to supply the service. By using such an arrangement the application can make use of services provided by remote systems.

In the following discussion, as is known in the art, the term "server" may be used to refer to computer-program code that provides a service, the hardware processing such code or a combination of the above. It may also be used to refer to a dedicated hardware device providing an equivalent function. Examples of possible servers include, amongst others: report servers, email servers, Public-Key Infrastructure (PKI) servers, Lightweight Directory Access Protocol (LDAP) repository servers, and Single Sign-On (SSO) manager servers. Reference will also be made to "external" or "third-party" services, however, such a definition is also to include services provided by the same company or organization of a given application. The term "service" should also be distinguished from the inclusion of external libraries (e.g. Dynamic Link Libraries (DLLs) or Java ARchives (JARs)) within a software application. In this case, such libraries need to be packaged with the application and thus may be seen as existing within the boundary of the application. Even in cases when such libraries are not packaged with the application they may be seen to form part of the operating environment of the application and are thus not provided independently.

By using external services, application developers are able to quickly and easily build application systems by effectively outsourcing non-essential operations to external applications. The application developer is also able to make use of knowledge that may not be available in their own team or company. For example, in order to rapidly produce a reasonably inexpensive application, an application developer may make use of a third party reporting service to provide reports to a user. This also increases specialization, modularity and labor reuse.

In the prior art, in order to make use of an external service, the application developer would typically incorporate information pertaining to the defined interface for the service into their application. For example, said application could comprise a module comprising computer-program code that integrates the internet-protocol (IP) address and required command protocol for the server hosting the external service, e.g. "diamond_report_server=123.168.2.1; diamond_report_server.report_cmd_56(data1, data2...dataN);". The module may then be used as part of the application implementation to send a service call to the server hosting the service.

With the growth of services available over the internet and the like, an application developer is increasingly offered a wide choice of service providers. A user may also regularly use existing or legacy software systems, and may expect new applications to successfully operate with such systems. Even with the use of modern standards and open-source methods, an application developer may be bombarded with interface specifications and communications protocol. As the details of the service or services to be used by the application are typically integrated into the compiled code of the application itself (i.e. "hard-wired" into the application), much time, effort and money is required adapting the application to make use of the service or services. This not only negates a large portion of the initial efficiencies provided by the use of an external service, it also makes the resulting application reasonably inflexible. Furthermore, when producing a plurality of applications for a number of different users, much effort is duplicated when adapting the application to make use of a known service. In such systems it is also difficult for a user to suggest their own services in place of a predetermined service or change said service at a later point in time.

With the management of third-party services, one technology that exists to facilitate the management of such services is referred to as "single sign-on" (SSO). An SSO system uses a primary domain manager to present an authorization front-end to the user, e.g. in the form of a log-in screen implemented in Hyper-Text Markup Language (HTML) provided at a particular Hyper-Text Transfer Protocol (HTTP) address. The user logs into the primary domain through the authorization front-end using their primary domain log-in and password. Once registered with the primary domain, the user registers their log-in details for a number of secondary domains, these authorization details are then saved by a user account manager. The user is then able to access services provided in the secondary domain via a primary domain shell, wherein the log-in details for the secondary domains are passed from the primary domain to the secondary domain by the user account manager transparently to the user. Thus after the user "signs-on" once he or she is provided with access to multiple services. A well known example of an SSO system is the Athens service provided by Eduserv, a UK charity.

Whereas SSO systems facilitate the use of multiple services their operation is limited to authentication and authorization, i.e. to passing username and password parameters between servers. They typically operate by the redirection of uniform resource locators (URLs), i.e. access of secondary domain servers via a defined HTTP address will be routed via the HTTP address of the primary domain manager. This makes them unsuitable for providing the data exchanges required for the implementation of services with applications. Additionally, such systems require a central identity manager. The communication of authentication and authorization information also risks interception and exploitation by malicious parties.

Hence, in the art there is a need for systems and methods to enable the organization of services that are used within the provision of an application to a user. Furthermore, there is a need for systems and methods that provide flexible and expandable use of such services.

SUMMARY OF THE INVENTION

According to a first aspect of the present invention, there is provided a system for managing one or more services during the provision of an application to a user comprising:

an application component operably connected to a network; and configuration data for the user specifying:

one or more partner servers configured to supply one or more respective services within one or more respective service categories, each partner server in a service category being chosen from a plurality of available partner servers for the service category; and communication parameters for each partner server that allow communication with the partner server over the network;

wherein, during the provision of the application to the user, the application component uses the configuration data for the user to access a service provided by an appropriate partner server.

Such a system enables a user or customer to select a particular service provided by a particular server partner from a group of possibilities. This effectively allows different services to be modularly added to an application transparently from the point of view of a user or customer. By using configuration data the partner server may be substituted for another at a later point in the lifecycle of the application. The system enables the developer or application manager to retain control of the services used by an application, while remaining open to solutions that cross organizations, operating systems and hardware platforms. As well as increased control, the developer or application manager is also provided with a well-defined knowledge repository that may be used to easily map the interactions between user, application and service.

Preferably, the application component is adapted to perform the steps of:

receiving a request to access a service, the request comprising request parameters including a service category;

accessing the configuration data for the present user to determine the appropriate partner server based on the request parameters; and executing the request to access the service using the configuration data.

In this case, the request may be received from either a client device of the user or from the application and the request may also further comprise data associated with the service. If the request comprises data, the application component may be further adapted to perform the steps of: processing the data associated with the service if required, and forwarding said data in an appropriate format to the partner server.

Preferably, the system further comprises:

a management component operably connected to the network; and definition data specifying:

one or more service categories;

a plurality of available partner servers connected to the network that provide a plurality of respective services, each partner server being associated with a selected one of the service categories; and communication parameters for each partner server that allow communication with the partner server over the network;

wherein, before implementation of the application, the user selects a partner server for each service category from the plurality of available partner servers and the management component processes this selection and the definition data to generate the configuration data.

Hence, when a particular service provided by a partner server is altered, for example due to an upgrade or a patch, only the definition data for the particular partner server need be edited, and possibly the configuration data regenerated, avoiding the need to re-install components on both the application and partner server sides. In certain embodiments the configuration data may include a reference to the definition data. In other embodiments the configuration data may be used independently of the definition data.

Preferably, the system further comprises: a first computer comprising a processor and memory for implementing the application component and optionally the application; and a first storage device accessible by the application component for storing the configuration data.

The first computer may be operably connected to a client device operated by the user and the application may be adapted to communicate with the client device to return the results of the service.

Preferably, the system further comprises: a second computer comprising a processor and memory for implementing the management component, the second computer being optionally distinct from the first computer; and a second storage device accessible by the management component for storing the definition data, the second storage device being optionally distinct from the first storage device.

Preferably, the management component is further adapted to perform the steps of: receiving a request from a user to add, edit or delete data associated with a partner server within the definition data; and amending the definition data accordingly, including assigning the partner server to a service category if required.

Hence, the definition data is configurable and may be edited by the application manager or the user.

Preferably, the management component is further adapted to perform the steps of:

approving or denying the request, the definition data only being amended following approval.

This is typically the case when the application manager wishes to retain executive control of the definition data, and thus the application manager may approve or deny a request from a user or customer.

In certain embodiments, the management component is adapted to perform the steps of: receiving a request from a user to add or replace one or more partner servers associated with one or more respective service categories within the configuration data; and amending the configuration data associated with the appropriate service categories accordingly.

Hence, the configuration data is configurable and may be edited by the application manager or the user. Editing the configuration data will alter the run-time implementation of the application.

The management component may be further adapted to perform the steps of: approving or denying the request, the configuration data only being amended following approval.

This is typically the case when the application manager wishes to retain executive control of the configuration data, and thus the application manager may approve or deny a request from a user or customer.

In the preferred embodiments discussed above, the steps may be dictated by instructions or computer-program code that is, in use, processed by a processor of the management component. Alternatively, the management component may comprise fixed or programmable logic circuitry to provide the same functionality.

Preferably, one or more of the definition data and the configuration data are encrypted to prevent unauthorized access. Such encryption may use a public key infrastructure (PKI), wherein one or more of: the management component, the application component, the application, one or more of the partner servers, or any operator within the system are trusted parties within the PKI. The communication between parties may also be encrypted. This may be using the PKI parameters or may use a separate layer of security. For example, a service may be hosted at a secure HTTP address (HTTPS). By encrypting the definition and configuration data, as well as communicated data, an application manager can maintain control of such data and prevent unauthorized access, whether it be malicious or accidental.

Preferably, one or more of the definition data and the configuration data comprise one or more eXtended Markup Language (XML) documents.

In certain embodiments, the definition data comprises one or more of: data identifying the service category; and one or more partner server types that may be assigned to the service category, each partner server within the definition data being assigned a partner server type, each partner server type comprising data identifying one or more of: communication parameters common to the partner server type; error protocol common to the partner server type; and version information.

Preferably, the data identifying any communication parameters common to the partner server type comprises one or more of: a common uniform resource locator (URL); common login information; and metadata, for example template or format information.

Preferably, the definition data specifying one or more individual partner servers comprises one or more of: data identifying the partner server; and parameters specific to the partner server, for example an HTTP address and port.

A method of managing one or more services during the provision of an application to a user comprising:
  a. defining one or more service categories;
  b. assigning a plurality of partner servers to the one or more of the service categories, wherein each partner server provides a particular service;
  c. for each assigned partner server, defining communication parameters that enable communication with the partner server over a network to provide the particular service;
  d. selecting a partner server for each service category to provide a specified application to a user; and
  e. using one or more selected partner servers and the appropriate communication parameters to access one or more respective services as part of the provision of the specified application.

Such steps may be performed by an application manager using a management component and/or an application, wherein the first four steps typically comprise an initial set-up that may be applied during development of an application by a management component and the fifth step comprises the use of the information defined during set-up at run-time by the application. This method provides similar advantages to the first aspect of the invention. In a preferred embodiment the second aspect, the invention provides a computer-implemented method, wherein each step may involve computer processing and/or interaction with an operator. Typically, the step of selecting a partner server for each service category comprises selecting a single partner server for the category.

Preferably, the first three steps further comprise storing the results of each step as definition data and the fourth step further comprises storing the result of this step as configuration data.

Preferably, the method further comprises the step of encrypting all or part of the stored data. Such encryption may be performed within a public key infrastructure (PKI), wherein one or more of the partner servers, or any operator of one or more of the partner servers may be trusted parties within the PKI.

Preferably, all or part of any stored data is stored in an eXtended Markup Language (XML) format.

Preferably, the fifth step further comprises the steps of:
  executing an application on an application server, said application requiring, in use, access to a service;
  determining the service category required for the service;
  determining the selected partner server for the service category;
  accessing the communication parameters for the selected partner service; and
  communicating with the selected partner service over the network using the communication parameters in order to access the service.

The fifth step may also comprise: communicating with a client device of the user over the network.

Preferably, the method further comprises:
  receiving a request from a user to add, edit or delete a partner server; and
  amending the group of assigned partner servers accordingly.

The method may also further comprise: approving or denying the request, the group of assigned partner servers only being amended following approval.

Preferably, the method further comprises:
  receiving a request from a user to change one or more selected partner servers associated with one or more respective service categories; and
  amending the group of selected partner servers accordingly.

Such a method may also further comprise: approving or denying the request, the group of selected partner servers only being amended following approval.

Preferably, the method further comprises the step of communicating with one or more partner servers over the network using a secure communication link.

According to a third aspect of the present invention there is provided a computer program product comprising instructions for performing the previously described method.

BRIEF DESCRIPTION OF THE FIGURES

An exemplary embodiment of the invention and a number of variations will now be described in relation to the accompanying drawings, in which:

FIG. 10 shows a first exemplary portion of definition data according to a variation of the present invention;

FIG. 11 shows a second exemplary portion of definition data according to a variation of the present invention; and FIG. 12 shows a third exemplary portion of definition data according to a variation of the present invention.

DETAILED DESCRIPTION OF THE EMBODIMENTS

Figure 1:
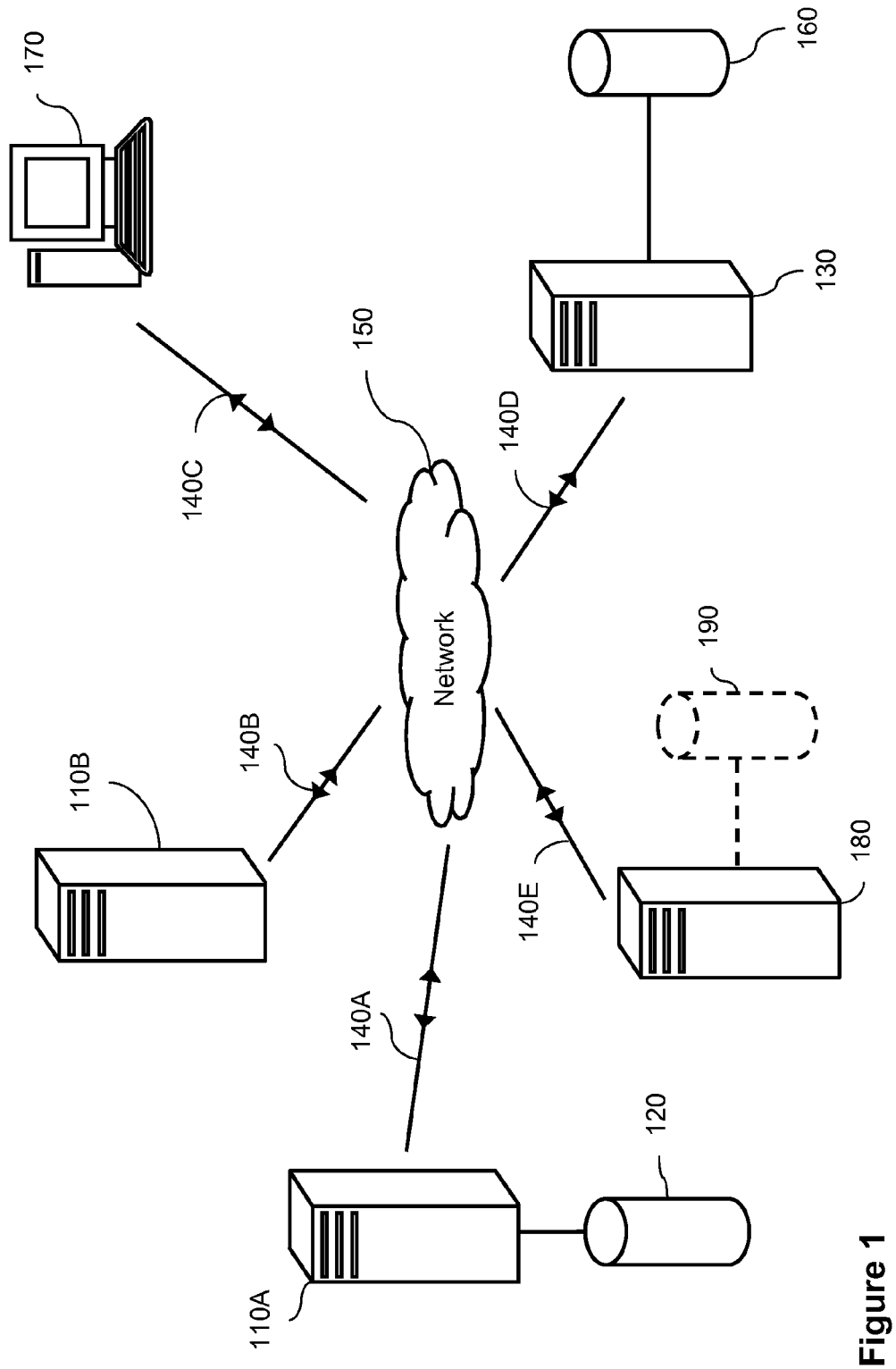
FIG. 1 shows an exemplary network for providing the present invention.

FIG. 1 shows an exemplary network arrangement for use with the management method and system of the present invention. The components shown in FIG. 1 represent a necessary simplification of an actual network arrangement in order to clearly explain the operation of the present invention. Hence, such an arrangement should not be seen as limiting and the skilled person would understand that any known network topology with any number of devices may be used.

FIG. 1 shows a number of computer systems connected to a central network 150. Central network 150 may comprise any network arrangement within the art, including a local area network (LAN), a wide area network (WAN), or a combination of different network types, such as an internet or the Internet. Such a network may comprise any number of gateways, bridges or routers and may operate according to any known protocol, with wired and/or wireless communication between nodes. In the present description, the network will be presumed to be a Transmission Control Protocol/Internet Protocol (TCP/IP) based network. The communication links 140 may also be secure links using encryption standards known in the art.

Connected to the network 150 are two partner server computers 110A and 110B. These partner server computers are connected to the network 150 by respective links 140A and 140B, which may be wired and/or wireless. Each partner server computer may comprise a standard computer system, such as that shown in FIG. 8 and described below, configured appropriately to provide a required service. In FIG. 1, partner server computer 110A is also operably connected to database 120. In this example, "database" should be interpreted broadly to refer to any collection of data files. Database 120 may be implemented on suitably configured storage means and is optionally provided if required to provide a particular service. Also connected to the network is a client device 170. In this example a single device is shown, however, in an actual implementation many such devices may be provided to accommodate a plurality of users. Client device 170 comprises a suitably configured computer system and connects to the network through communication link 140C. Client device 170 may also comprise a handheld device such as a portable computer or a mobile cellular telephone. Client device 170 is typically operated by a user of an application.

FIG. 1 also shows an application computer 180 and a management server computer 130. Application and/or management server computer may comprise a standard computer system; each computer is connected to the network 150 by network links 140D and 140E. Application computer 180 is configured to process computer program code to provide an application to one or more users 170. Application computer 180 may be operably connected to optional database 190. Management server computer 130 is configured to process computer program code to define and/or configure the provision of services during operation of the application. Management server computer 130 may also be optionally connected to a database 160 or other storage means.

Figure 8:
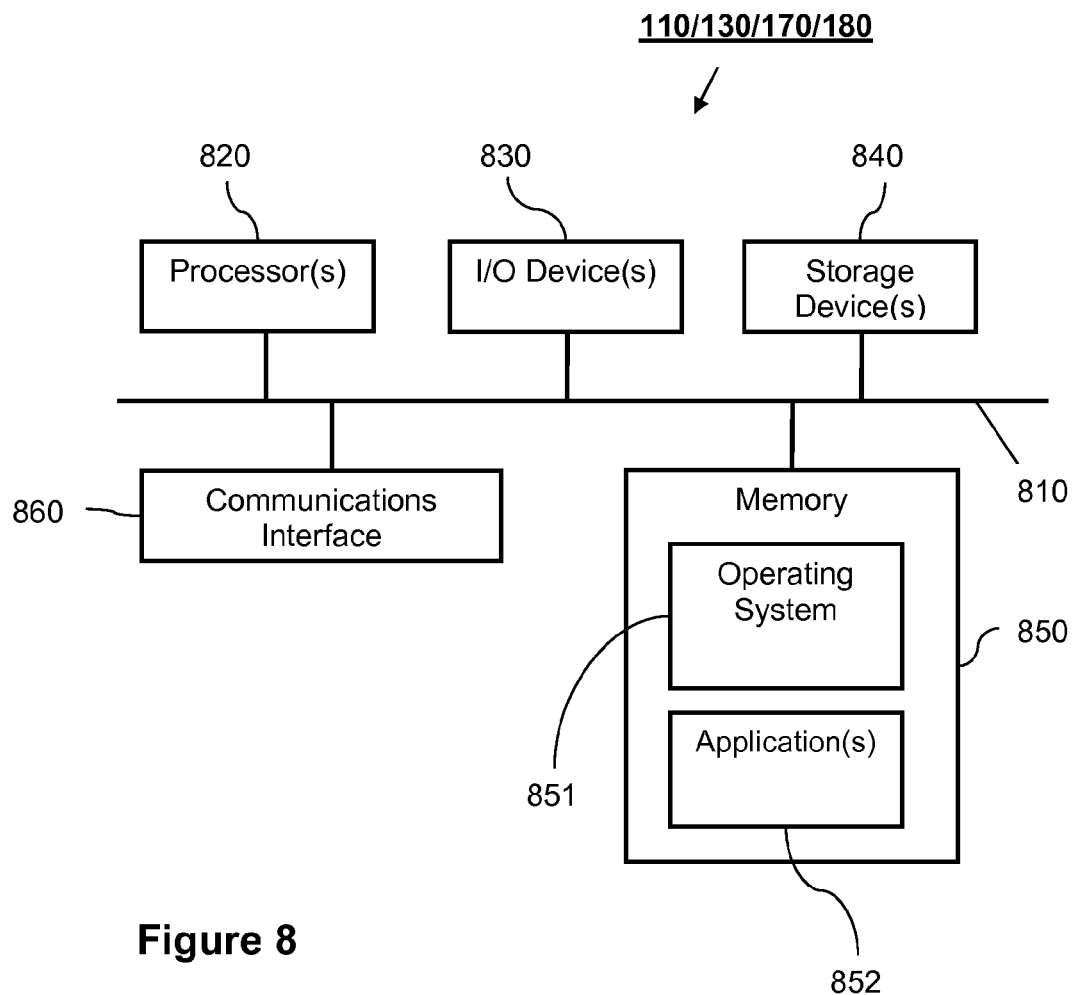
FIG. 8 schematically illustrates the components of a typical computing device to be used with the present invention.

An exemplary computer system is illustrated in FIG. 8. Such a computer system may be used to provide any one of server computers 110, 130 and 180 or client device 170. One skilled in the art would also be aware that the components of each server computer 110, 130, 180 may differ from each other and client device 170 depending on requirements. The computer system of FIG. 8 comprises one or more processors 820 connected to a system bus 810. Also connected to the system bus 810 is memory 850, which may comprise any random access or read only memory (RAM/ROM), and communications interface 860, which enables communication over communication links 140 and network 150. The computer system may also optionally comprise one or more storage devices 840 and additional input/output (I/O) devices 830. Storage devices 840 may be any known local or remote storage system and may be configured to store data associated with databases 120, 160 or 190. In use, computer program code is loaded into memory 850 to be processed by the one or more processors 820. In the example of FIG. 8, an operating system (OS) 851 is loaded into memory 850 together with one or more applications 852. The OS 851 and/or the one or more applications 852 may comprise suitably configured computer program code to enable the proper functioning of the computer system, for example to provide a management server, a partner server, an application or client software. In alternate embodiments, the functional aspects of the components shown in FIG. 8 may be provided by dedicated hardware.

Figure 2:
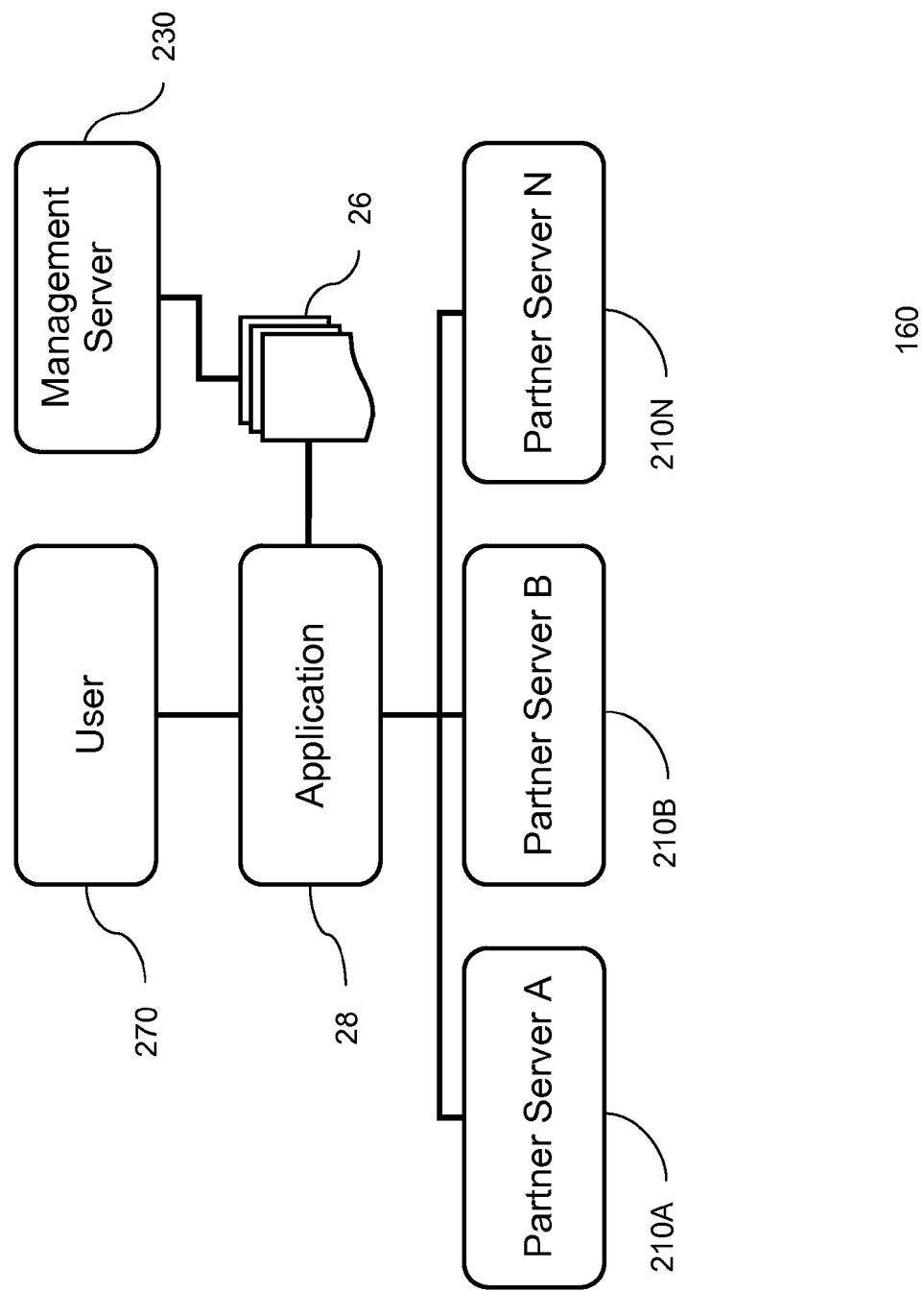
FIG. 2 shows the organization of a set of exemplary components that may be used by the present invention.

FIG. 2 shows a plurality of components that may be implemented by computer-program code being processed by the computer systems of FIG. 1. Client device 170 may implement client or user component 270. This may comprise a dedicated client application running upon client device 170, a web application accessed via an Internet browser, or a user-interface displayed by thin-client hardware. In the following description it will be assumed that client device 170 comprises memory and a processor to load and implement client-side computer-program code; however, in other embodiments, client device 170 may comprise a display device with dedicated hardware to render a user-interface based on communications from a server computer (i.e. without requiring client-side program code).

In use, user component 270 communicates with an application 280 implemented by application computer 180. For example, application 280 may comprise computer program code to be processed by a processor of application computer 180. Application 280 may comprise one or more application processes, threads, or components that operate in parallel. In use, application 280 accesses services. To do this, a run-time component implemented as part of application 280 accesses one or more data files 260. Data files 260 may be stored within database 190. In the present case "runtime component" is to be interpreted as meaning an entity, optionally comprising computer-program code, that is implemented when the application is implemented or "run". Data files 260 comprise definition and/or configuration data that are accessed to enable appropriate communication for a particular category of service. These data files may comprise one or more eXtended Markup Language (XML) files. These files may be encrypted as part of a public key infrastructure (PKI), wherein one or more of the application 280, the management server 230 and the partner servers 210 may be trusted parties to the infrastructure.

Application 280, using the runtime component, then communicates with one or more partner servers 210 to provide a selected service. In FIG. 2 three partner servers are shown: partner server A 210A which may supply service A, partner server B 210B which may supply service B and partner server N 210N which may supply service N. Any number of partner servers may be accessible by application 280. Each partner server may comprise computer program code that, in use, is processed by one of partner server computers 110.

FIG. 2 also shows a management server 230. Management server 230 may comprise computer program code or one or more components to be processed by a processor of management server computer 130. In certain alternate embodiments, management server computer 130 and application computer 180 may comprise a single device. Likewise, in other alternate embodiments, management server 230 and application 280 may represent two different processes within a unified program.

Management server 230 is essentially an administrative entity whose role is to setup the interface between the application 280 and the partner servers 210. It does this by generating data files 260. This is typically performed before the application 280 is initiated. Once data files 260 have been generated, the management server 230 is typically not involved in the communication between the application 280 and an appropriate partner server 210. However, if required, the management server 230 may be optionally configured to centrally record or "log" events and data during the communication between the application 280 and an appropriate partner server 210 and any errors that may occur. The process for generating data files 260 performed by management server 230 is described in more detail below. Management server 230 manages the provision of the service to enable the application 280 to provide the appropriate data to the user software 270.

In an optional embodiment of the present invention, management server 230 may be configured to communicate with (for example: "ping") any of the partner servers 210 over network 150 to ensure that the operating specification of each partner server 210 matches the definition and/or configuration data stored in data files 260. The management server 230 may also be configured to check the availability and operating version of each partner server 210.

A method of managing services provided by a plurality of partner servers will now be described in relation to the flow charts of FIGS. 3 to 5.

Figure 3:
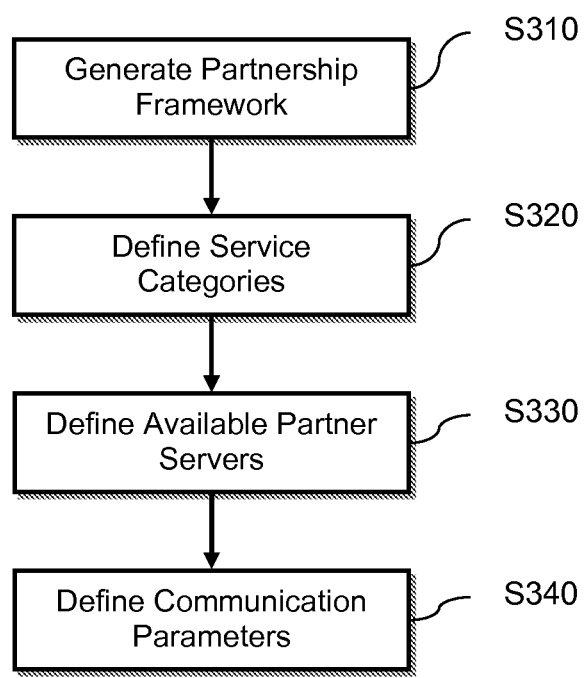
FIG. 3 shows the method steps involved in setting up a system according to the present invention.
Figure 6A:
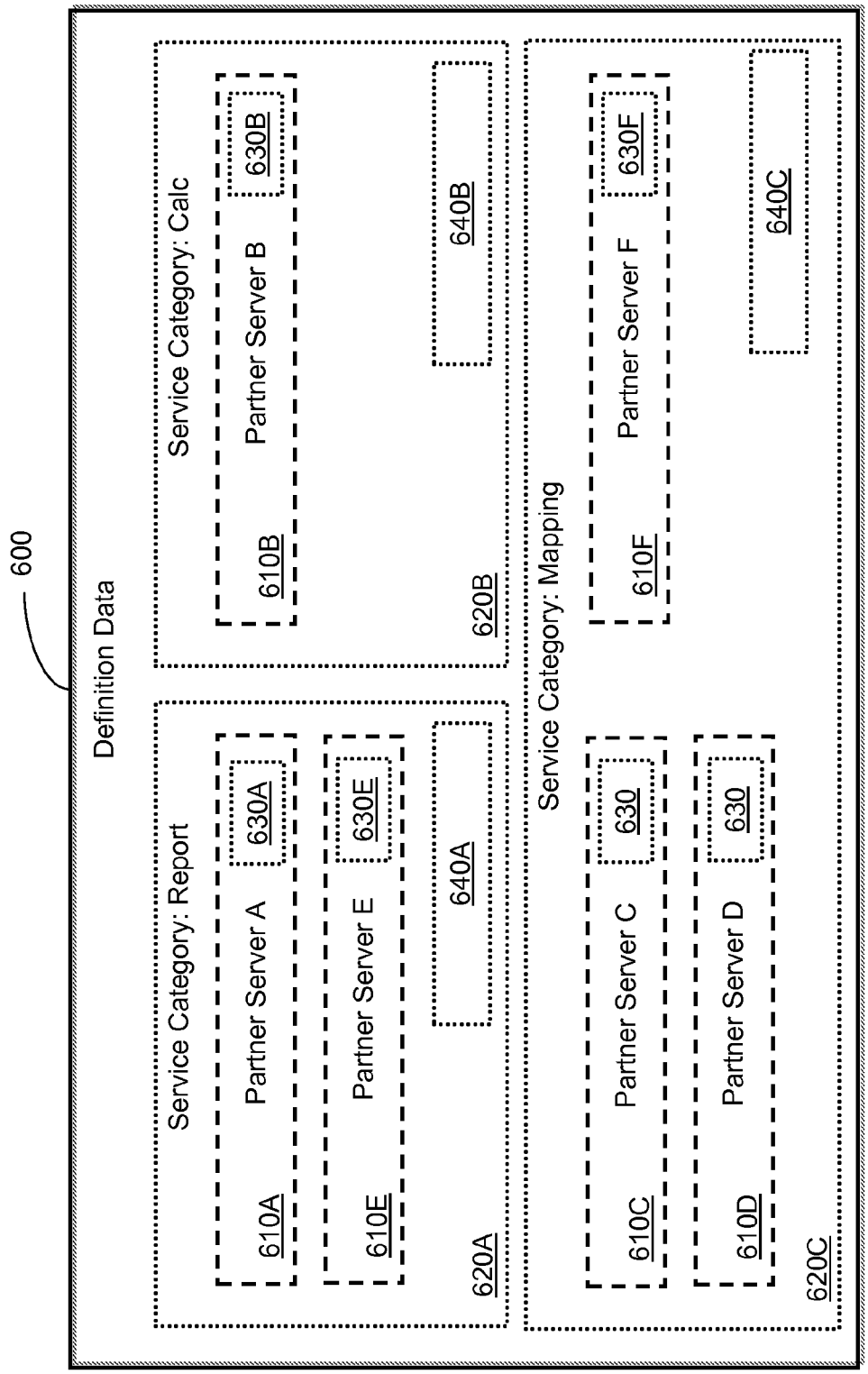
FIGS. 6A and 6B schematically illustrate the contents of an exemplary set of definition data according to the present invention.

FIG. 3 shows the steps involved in setting up a management system according to the present invention. FIG. 6A then shows the data generated by this method. The method begins at step S310 wherein a partnership framework is generated. This step typically comprises identification and registration of the management server 230. This step may also comprise assigning an operator to become a partnership manager. This operator will then be responsible for the implementing the steps of FIG. 3 using management server 230.

At step S320 a number of service categories are defined. A "service category" is a grouping of technologies and/or services having related contributions. For example in FIG. 6A the service categories are "Report" 620A that provides reporting services, "Calc" 620B that provides various calculation services and "Mapping" 620C that provides various services for geographic mapping. Each service category 620 may have associated metadata 640 relevant to that category. The available categories may be defined in an XML document, which may be edited by the partnership manager.

Once a service category has been assigned in step S320, a number of available partner servers are identified for each service category at step S330. Depending on requirements each partner server may be defined before being assigned to a service category or may be defined after selecting a particular category. FIG. 6A shows an example wherein the partnership manager knows of three different parties that provide mapping services: partner server C, 610C, partner server D, 610D, and partner server F, 610F. Each partner server may be identified by one or more of a path address, a URL, an IP address, a software reference (e.g. name and version number), and a descriptive partner name. At this stage operational parameters specific to each partner server may also be defined. The data identifying each partner server may be stored as an XML file.

At step S340 a set of corresponding communication parameters 630 are defined for each partner server. Such communication parameters set out the commands and protocols required to successfully communicate with each individual partner server and may comprise appropriate security parameters to set-up a secure communication link. The parameters may extend metadata 640 defined at the level of service category or may form part of the data identifying each partner server described above. FIG. 6A also shows three other partner servers: partner server A, 610A, partner server B, 610B and partner server E, 610E. Each server has associated communication parameters 630. In FIG. 6A partner server A, 610A, and partner server E, 610E, are assigned to the service category "Report" 620A and partner server B, 610B, is assigned to the service category "Calc" 620B. In a preferred embodiment, definition data 600 is stored as one or more XML files on a storage means.

The definition data 600 provides a general set of data that may be used when developing or instantiating a particular application for a particular user. In this case, instantiating may be seen as the process of finalizing computer-program code so that it may provide given functionality at run-time when processed by a processor. The configuration steps for instantiating an application for a particular user are shown in FIG. 4.

Figure 4:
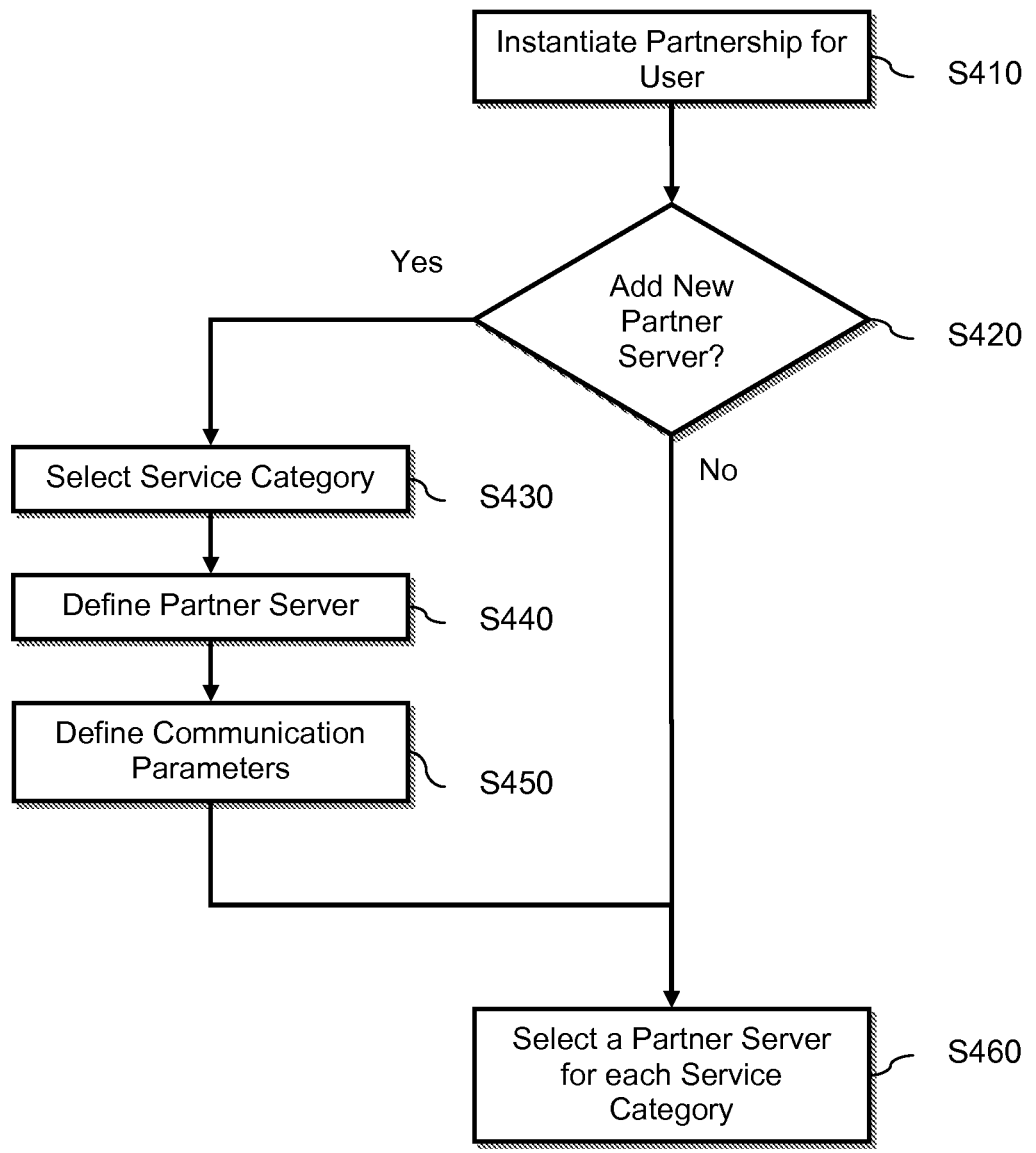
FIG. 4 shows the method steps involved in registering a user in the system.
Figure 7:
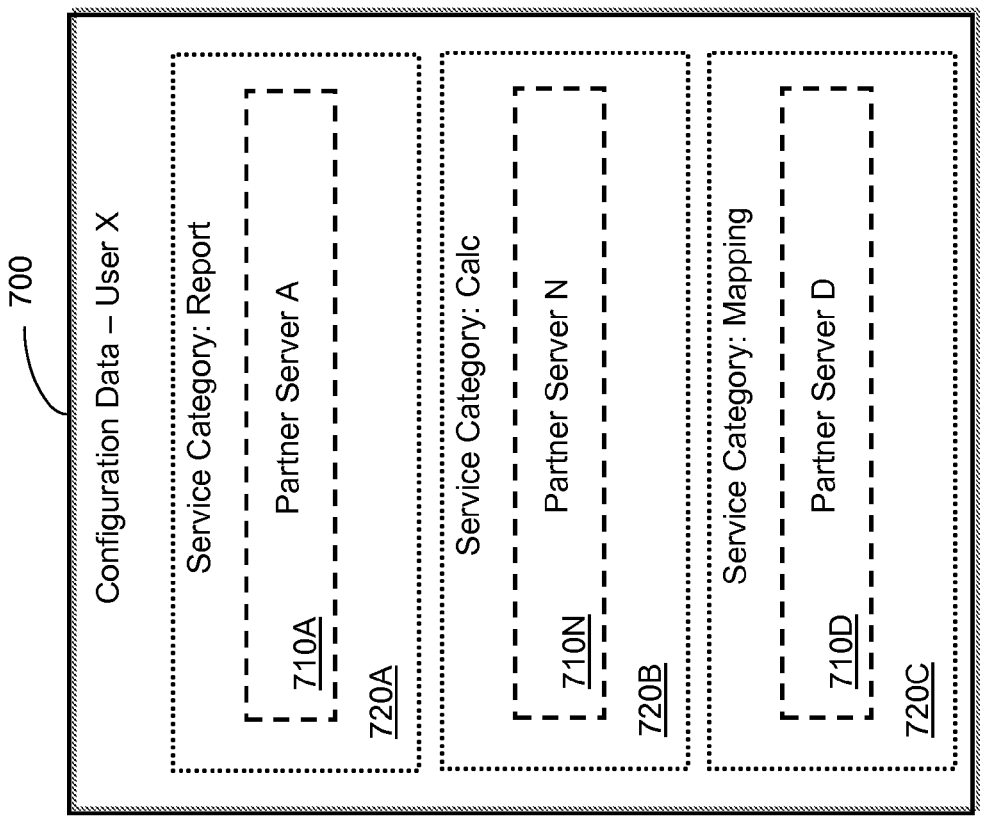
FIG. 7 schematically illustrate the contents of an exemplary set of configuration data according to the present invention.

The method of FIG. 4 begins at step S410 wherein a partnership is instantiated for a current user. In this case a "user" may comprise an individual or a group of related individuals such as a company or company department. The instantiation comprises the generation of configuration data as shown in FIG. 7. At step S420 the user or customer is offered the option of adding a custom partner server to the group of partner servers defined in the definition data 600 shown in FIG. 6A. For example, the user may use a legacy application that they wish to integrate within the application. Such a legacy application may be implemented locally or remotely.

Figure 6B:
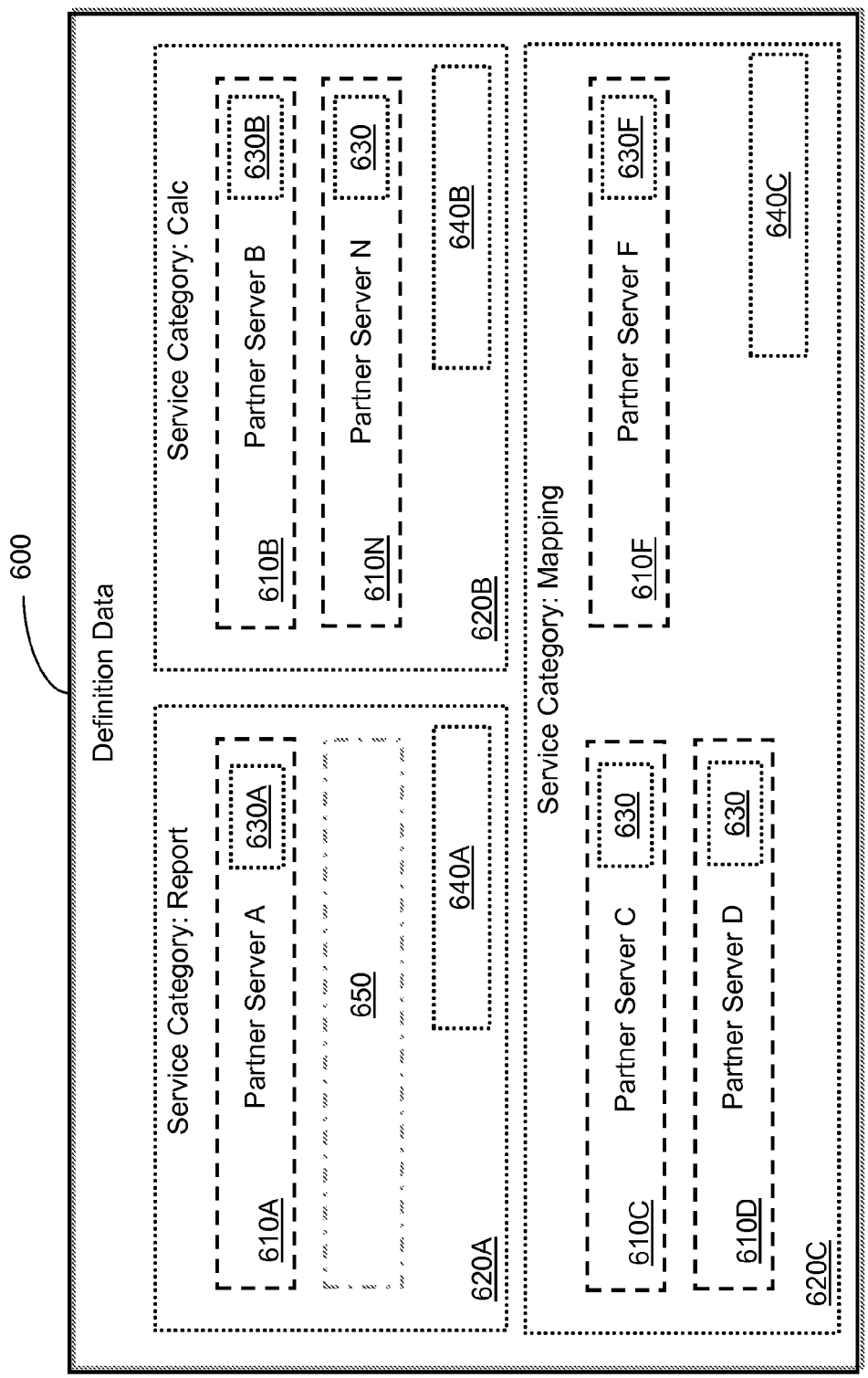

If a user wishes to add a new partner server then steps S430 to S450 are carried out. At step S430 a particular service category is selected. For example, in FIG. 6B the user may select service category "Calc" 620B. At step S440 the user, possibly in combination with the partnership manager, defines a partner server to be added to selected service category. In FIG. 6B the user chooses to add partner server N, 610N, to the selected service category 620B. At step S450 the user may additionally add communication parameters 630N for the added partnership server, or may alternatively leave this to the partnership manager. As part of the process the partnership manager may also optionally review the proposed custom partner suggested by the user and approve or deny its addition to definition data 450.

Similar steps to S430, S440 and S450 may also be carried out to edit or remove partner servers from the definition data 600. For example, FIG. 6B also shows a deleted partner server 650 wherein a user and/or a partnership manager has chosen to delete partner server A from the list of available servers in a service category "Report" 620A.

Returning to FIG. 4, at step S460 the user selects a particular partner server for each relevant service category that will be used for the application in question. This step finalizes the creation of the configuration data 700 shown in FIG. 7.

Turning to FIG. 7, we see that user X has selected partner server A from the service category "Report" and so the configuration data for this user comprises an identifier for partner server A, 710A, under the service category "Report" 720A. Likewise, user X has chosen partner server N to be the service provider in the service category "Calc" and thus an identifier for partner server N, 710N, is added to the data for the service category "Calc" 720B. Partner server D has also been chosen as the selected partner in the service category "Mapping" and so identification data for partner server D, 710D, is added to the relevant category "Mapping" 720C in the configuration data 700. Hence, following the method of FIG. 4, a particular user defines the partnership servers that are to be used to provide the services within the application.

The configuration data 700 may contain all the information required by the application or application component to successfully access a service in response to a service call based on a service category. Management server 230 may process the definition data 600 to produce the configuration data 600. The configuration data 600 is preferably stored locally to any computer-program code implementing application 280. In certain embodiments, the definition data 600 and the configuration data 700 may be stored as separate files or as a single combined file in database 160. Alternatively, in other variations, the definition data and the configuration data may be stored on remote storage means.

Figure 5:
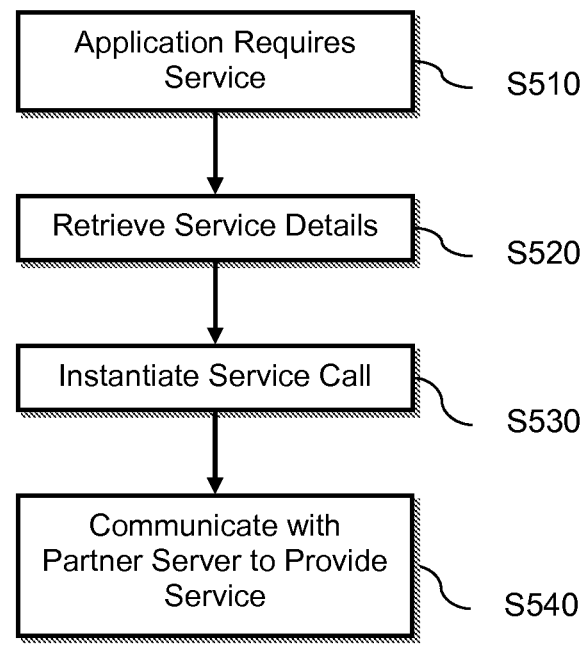
FIG. 5 shows the method steps involved when a request for a service is received.

FIG. 5 demonstrates the steps involved in managing a request for a service using the present invention. The services supplied by the one or more partner servers are typically defined using an Interface Definition Language (IDL) or a Web Services Description Language (WSDL), i.e. one or more processes that make up the service may be initiated on a partner server by the application using commands specified in a format independent of any one programming language. This then allows different hardware and/or systems to communicate and interact. Each command or service call may comprise one or more of a name, a set of (input) argument types, an output or result type and an exception or error type.

As an example, in a Java language system, a service may be embodied by a Java interface, possibly in the form of a single operation within this interface, which is accessed using a service factory (i.e. a set of processes based on the factory design pattern). The service may be invoked by via the service factory using the service name.

At step S510, the application 280 requires a service. This may be initiated based on data received from user component 270 or computer-program code implementing the application.

At step S520, service details are retrieved. In certain embodiments, the application 280 initiates the service call by first retrieving an interface from a service registry, optionally implemented in Java. The interface comprises a single operation, possible in Java, denoting the service. This step also comprises determining the service category.

At step S530, the service call is instantiated. This is typically performed by the runtime component on the application computer 280. This step may involve determining the current user, if there are multiple users. The runtime component accesses appropriate configuration data 700 for the current user from data files 260 to build a service request based on the service operation or interface retrieved at step S520 and the present service category. For example, for User X and a service category of "Report", data 720A is inspected and partner server data 710A retrieved. This step also involves accessing the communication parameters associated with the partner server. Preferably, such parameters are stored as part of the configuration data 700. However, in variations of the present invention data such as communication parameters may be retrieved from the definition data 600 based on data entries within the configuration data 700, wherein the definition data 600 may be stored locally or remotely. Any retrieved data from one or more of configuration data 700 and definition data 600 may then be used by the runtime component to generate an appropriate HTTP request. In the case of a "Report" service call, instantiated parameters may comprise context information such as report template and output format.

At step S540, the application 280 communicates with the partner server to provide the required service. For example, if the service request generated by the runtime component at step 530 comprises an HTTP or HTTPS request, such a request may be passed to an HTTP or HTTPS client implemented on application computer 180 as part of application 280 which will then send the request to the identified partner server. The selected partner server is then able to provide data over the network to fulfill the service request, for example, a report in the form of binary data. The application 280 may then further supply such data to the user component 270. Application 280 may also process any data returned from the partner server in order to supply the user component 270 with appropriately formatted data.

A preferred variation of the above system and method will now be described by way of an example with reference to FIGS. 9 to 12. Unless stated otherwise such a variation uses the components and method steps set out above.

Figure 9:
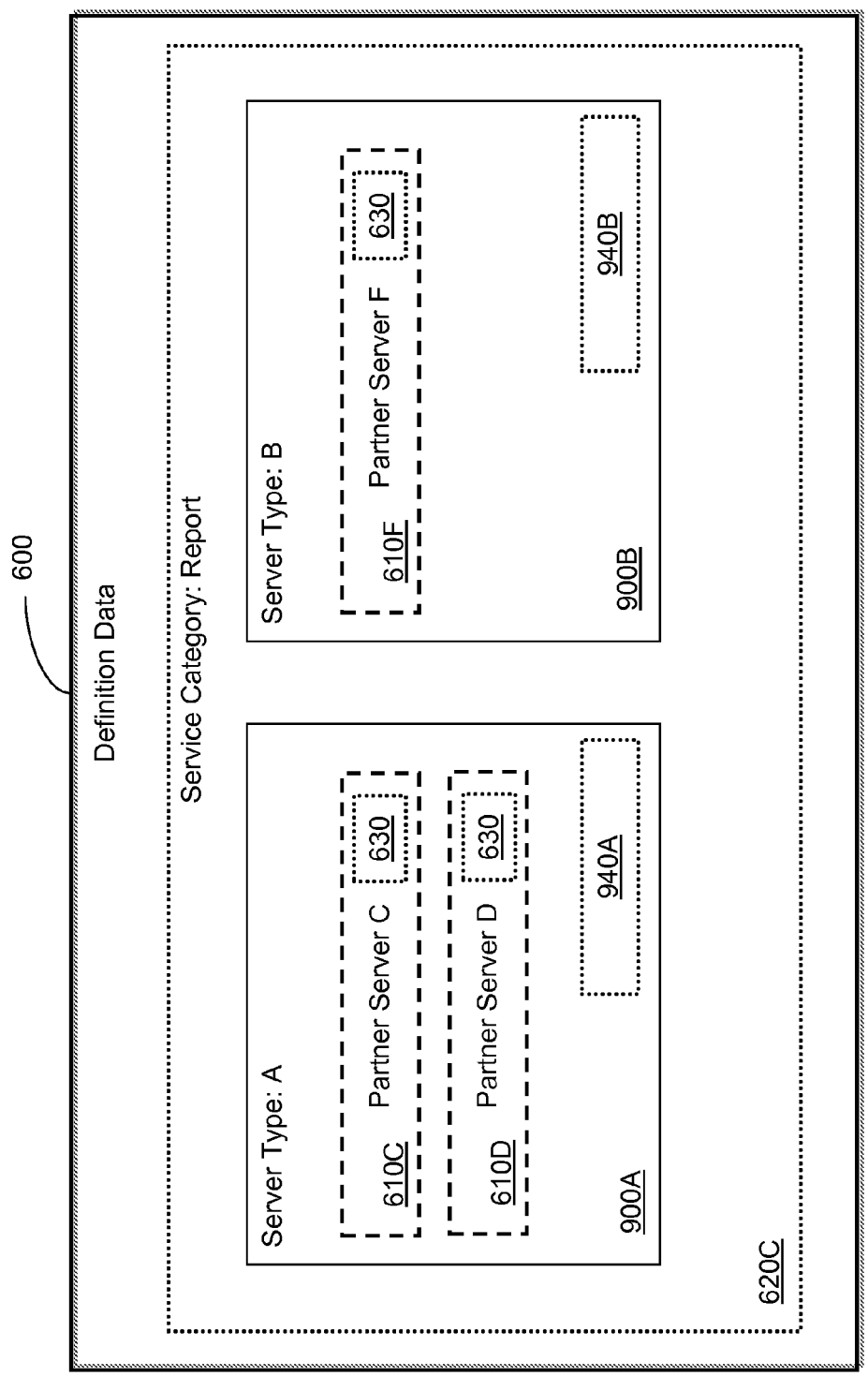
FIG. 9 schematically illustrates the contents of an exemplary set of definition data according to a variation of the present invention.

FIGS. 10 to 12 show the data that is defined in order to produce the definition data 600 illustrated schematically in FIG. 9. FIG. 10 shows an exemplary portion of definition data 600 that may be used to define the service category "Report" as shown in FIGS. 6 and 7. Such data is set out in an XML-type format for clarity of explanation but need not be limited to such a form. The category name is set as a parameter in a set of "category" tags or data fields; in the present example, as "Report". Similar definitions would be provided for the other service categories.

The present variation of the invention further defines a "partner server type" as an intermediate level of grouping between "service category" and "partner server". The use of partner server types enables parameters common to a group of partner servers to be defined without necessarily defining such parameters at the level of service category. In FIG. 10, two partner server types are defined, "PartnerTypeA" and "PartnerTypeB". These groupings are respectively schematically illustrated in FIG. 9 as data 900A and 900B. Each grouping has associated parameters 940A and 940B.

FIG. 11 shows the data that may be used to define partner server type A and its associated parameters 940A. In the present example, a number of implementation parameters are provided indicating the Java component used to implement the partner server type and the version of the component. Each parameter may have one or more entries and the invention may use implementation parameters other than those shown in the example. The implementation parameters define the way in which the interface between the application and partner servers of the specified type is embodied. In the present case, the Java component may be deployed with the application to ensure successful communication with a particular partner server using the HTTP protocol.

Additional parameters for the partner server type are provided within the "parameters" tag of FIG. 11. Such parameters may include, amongst others, error messages, protocol and codification, and communication parameters common to partner servers assigned to that type. The parameters may be used as well as or instead of metadata 640. The communication parameters might be those parameters that need to be exchanged with each partner server within the partner server type. In the example of FIG. 11 these parameters comprise: a URL, authentication and authorization information (e.g. login information comprising a username and password) and other metadata such as a template and/or template directory (not shown) and report format (in this case Page Description Format (PDF)). The URL may specify a path on a host that needs to be used to invoke the service. Typically, such a parameter is used when the URL path does not change from partner server to partner server. The URL may comprise variables that are inserted at run-time, i.e. when the service is called from a partner server. These variables will be passed as part of the service call from the application. The metadata may be related to the service category as is the case in the present example. Each partner server type may require different parameters to implement a service that provides the same or similar outputs.

Finally, FIG. 12 shows exemplary data to define a partner server, in this case partner server D, 610D. The opening tag defines the partner server name and its associated partner server type, in the present case partner server type A. The information in the opening tag may be used to uniquely identify the partner server, for example within an echo system of the application. An optional brief description, as also found in FIG. 11, is then provided before the properties of the particular partner server are defined. In the present example, two properties are defined: host and port. The host provides the IP address or URL at which the partner server is hosted, e.g. the unique address of one of partner server computers 110. Typically, the URL information at the partner server type level is used in combination with the URL information at the partner server level; however, in certain embodiments the URL defined at the partner server level may override the URL defined at the partner server type level. The port typically defines the TCP port that the partner server monitors for new service requests.

In the present variation, the definition data shown in FIGS. 9 to 12 will be used to enable a user to select a preferred partner server in each service category. For example, as part of steps S430 and/or S460 in FIG. 4, for a given service category, the user may pick a partner server type from a list of values. This could involve selecting one of partner server type A or B from a list containing both A and B, although in practical applications the list would comprise a greater number of choices. The data in FIG. 10 may also comprise a "labelkey" tag which may specify a resource key that enables the list to be populated. The "labelkey" tag may also enable the support of multiple languages. Once a partner server type is selected the user may then select a particular partner server belonging to that type. Once a partner server has been selected in this way for each service category the management server 230 may copy the relevant definition data to the application computer 180 or a storage device coupled thereto to produce configuration data 700 required to implement the service as described with reference to FIG. 5. In another variation the management server may generate configuration data and copy both configuration and definition data to a location local to the application computer 180. In a further variation the management server may retain one or more of the configuration and definition data on local storage which the application 280 is able to access remotely over network 150. The precise method used is chosen to suit particular circumstances for a particular implementation.

When discussing the prior art reference was made to an SSO system. Whereas a partner server as used in the present invention may comprise an identity manager within a SSO system, there are two important differences between the management server of the present invention and the identity manager.

Firstly, the main purpose of an identity manager is to provide and/or verify authentication and/or authorization information to client applications. Comparatively, the main purpose of the management server of the present invention is to define and/or configure an interface (i.e. the "partnership" of the present invention) between an application and external servers. Through a coupled repository of definition and/or configuration data the management server can support any kind of interface definition and/or configuration.

Secondly, the services of an identity manager are accessed during the execution of an application, for example to retrieve and/or validate credential information. In contrast, the management server of the present invention may be used to define, configure and deploy the interface with a partner server, wherein the partner server may be an identity manager. Once the management server has deployed the required interfaces, they may be used independently of the management server (i.e. by accessing the appropriate definition and/or configuration data), thus the management server need not be part of the runtime topology of the application.

It is important to note that while the present invention has been described in a context of a fully functioning data processing system, those of ordinary skill in the art will appreciate that the processes of the present invention are capable of being distributed in the form of a computer readable medium of instructions and a variety of forms and that the present invention applies equally regardless of a particular type of signal bearing media actually used to carry out distribution. Examples of computer readable media include recordable-type media such as floppy disks, a hard disk drive, RAM and CD-ROMs as well as transmission-type media such as digital and analogue communications links.

Generally, any of the functionality described in this text or illustrated in the figures can be implemented using software, firmware (e.g., fixed logic circuitry), manual computer-implemented processing, or a combination of these implementations. The terms "component", "module" or "function" as used herein generally represents software, firmware, or a combination of software and firmware. For instance, in the case of a software implementation, the terms "component", "module" or "function" may refer to program code that performs specified tasks when executed on a processing device or devices (e.g., processor(s) 820). The program code can be stored in one or more computer readable memory devices as described above. The illustrated separation of components and functionality into distinct units may reflect an actual physical grouping and allocation of such software and/or hardware, or can correspond to a conceptual allocation of different tasks performed by a single software program and/or hardware unit.

We claim:

1. A system for managing one or more services during the provision of an application to a user, the system comprising:
a memory storage device; and
a processor in communication with the memory storage device, wherein the memory storage device has sets of instructions stored therein which, when executed by the processor, cause the processor to implement:
an application component in communication with a network; and
configuration data for the user specifying:
one or more partner servers configured to supply one or more respective services within one or more respective service categories, each partner server in a service category being chosen from a plurality of available partner servers for the service category;
communication parameters for each partner server that allow communication with the partner server over the network;
wherein, during the provision of the application to the user, the application component uses the configuration data for the user to access a service provided by an appropriate partner server,
a management component in communication with the network; and definition data specifying:
one or more service categories;
the plurality of available partner servers connected to the network that provide a plurality of respective services, each partner server being associated with a selected one of the service categories; and
the communication parameters for each partner server that allow communication with the partner server over the network;
wherein, before implementation of the application, the user selects a partner server for each service category from the plurality of available partner servers and the management component processes this selection and the definition data to generate the configuration data.

2. The system of claim 1, wherein the application component is adapted to:
receive a request to access a service, the request comprising request parameters including a service category;
access the configuration data for the present user to determine the appropriate partner server based on the request parameters; and
execute the request to access the service using the configuration data.

3. The system of claim 2, wherein the request is received from either a client device of the user or from the application.

4. The system of claim 2, wherein the request further comprises data associated with the service, the application component further configured to:
process the data associated with the service if required; and
forward said data in an appropriate format to the partner server.

5. The system of claim 1, further comprising:
a first computer comprising the processor and the memory storage device for implementing the application component and the application.

6. The system of claim 5 wherein the first computer is in communication with a client device operated by the user and the application is configured to communicate with the client device to return the results of the service.

7. The system of claim 5, further comprising:
a second computer comprising second processor and a second memory storage device for implementing the management component, the second computer being distinct from the first computer.

8. The system of claim 1, wherein the management component is configured to:
receive a request from a user to add, edit or delete data associated with a partner server within the definition data; and
amend the definition data accordingly, including assigning the partner server to a service category if required.

9. The system of claim 8, wherein the management component is further configured to:
approve the request, the definition data only being amended following approval.

10. The system of claim 8, wherein the management component is configured to
receive a request from a user to add or replace one or more partner servers associated with one or more respective service categories within the configuration data; and
amend the configuration data associated with the appropriate service categories accordingly.

11. The system of claim 10, wherein the management component is further configured to:
approve the request, the configuration data only being amended following approval.

12. The system of claim 1, wherein one or more of the definition data and the configuration data are encrypted, within a public key infrastructure (PKI), to prevent unauthorized access.

13. The system of claim 12, wherein one or more of: the management component, one or more of the partner servers, or any operator of the management component or one or more of the partner servers are trusted parties within the PKI.

14. The system of claim 1, wherein one or more of the definition data and the configuration data comprise one or more eXtended Markup Language (XML) documents.

15. The system of claim 1, wherein communication between two or more of the application component, the management component, the application, one or more client devices, or one or more partner servers is encrypted.

16. The system of claim 1, wherein the definition data comprises one or more of:
data identifying the service category; and
one or more partner server types assigned to each service category, each partner server within the definition data being assigned a partner server type, each partner server type comprising data identifying one or more of:
communication parameters common to the partner server type;
error protocol common to the partner server type; and
version information.

17. The system of claim 16, wherein the data identifying any communication parameters common to the partner server type comprises one or more of:
a common uniform resource locator (URL);
common login information; or
metadata, for example template or format information.

18. The system of claim 1, wherein the definition data specifying one or more individual partner servers comprises one or more of:
data identifying the partner server; and
parameters specific to the partner server, for example HTTP address, or port.

19. A method of managing one or more services during the provision of an application to a user, the method comprising:

defining one or more service categories;

assigning a plurality of partner servers to one or more of the service categories, wherein each partner server provides a particular service;

for each assigned partner server, defining communication parameters that enable communication with the partner server over a network to provide the particular service;

selecting a partner server for each service category to provide a specified application to a user;

using one or more selected partner servers and the appropriate communication parameters to access one or more respective services as part of the provision of the specified application;

before implementation of the specified application, receiving a selection of a partner server for each service category from the plurality of partner servers and processing the selection to generate configuration data;

configuring one or more of the plurality of partner servers, based on the configuration data, to supply one or more respective services within the one or more service categories, each partner server in a service category being chosen from the partner servers assigned to the service category; and during the provision of the application to the user, using the configuration data to access the one or more respective services provided by the selected partner server.

20. The method of claim 19, further comprising:
storing the results of each step as definition data; and
storing the result of this step as configuration data.

21. The method of claim 20, further comprising-encrypting all or part of the stored data, within a public key infrastructure (PKI).

22. The method of claim 21, wherein one or more of the partner servers, or any operator of one or more of the partner servers are trusted parties within the PKI.

23. The method of claim 19, wherein all or part of any stored data is stored in an eXtended Markup Language (XML) format.

24. The method of claim 19, further comprising:
executing an application, said application requiring, in use, access to a service;
determining the service category required for the service;
determining the selected partner server for the service category;
accessing the communication parameters for the selected partner service; and
communicating with the selected partner service over the network using the communication parameters in order to access the service.

25. The method of claim 24, wherein the of executing an application further comprises communicating with a client device of the user over the network.

26. The method of claim 19, further comprising:
receiving a request from a user to add, edit or delete a partner server;
amending the group of assigned partner servers accordingly; and
approving the request, the group of assigned partner servers only being amended following approval.

27. The method of claim 19, further comprising:
receiving a request from a user to change one or more selected partner servers associated with one or more respective service categories;
amending the group of selected partner servers accordingly; and
approving the request, the group of selected partner servers only being amended following approval.

28. The method of claim 19, further comprising communicating with one or more partner servers over the network using a secure communication link.

29. A non-transitory computer-readable medium having sets of instructions stored thereon which, when executed by a computer, cause the computer to:
define one or more service categories;
assign a plurality of partner servers to the one or more of the service categories, wherein each partner server provides a particular service;
for each assigned partner server, define communication parameters that enable communication with the partner server over a network to provide the particular service;
select a partner server for each service category to provide a specified application to a user;
use one or more selected partner servers and the appropriate communication parameters to access one or more respective services as part of the provision of the specified application;
before implementation of the specified application, receiving a selection of a partner server for each service category from the plurality of partner servers and processing the selection to generate configuration data;
configuring one or more of the plurality of partner servers, based on the configuration data, to supply one or more respective services within the one or more service categories, each partner server in a service category being chosen from the partner servers assigned to the service category; and
during the provision of the application to the user, using the configuration data to access the one or more respective services provided by the selected partner server.

* * * * *